United States Patent
Mimura

(10) Patent No.: US 8,490,684 B2
(45) Date of Patent: Jul. 23, 2013

(54) DEVICE AND METHOD FOR ADJUSTING TEMPERATURE OF FLUID

(75) Inventor: Kazuhiro Mimura, Hiratsuka (JP)

(73) Assignee: Kelk Ltd., Kanagawa (JP)

( * ) Notice: Subject to any disclaimer, the term of this patent is extended or adjusted under 35 U.S.C. 154(b) by 1156 days.

(21) Appl. No.: 12/310,976

(22) PCT Filed: Sep. 21, 2007

(86) PCT No.: PCT/JP2007/068395
§ 371 (c)(1),
(2), (4) Date: Mar. 13, 2009

(87) PCT Pub. No.: WO2008/047531
PCT Pub. Date: Apr. 24, 2008

(65) Prior Publication Data
US 2009/0236072 A1    Sep. 24, 2009

(30) Foreign Application Priority Data
Sep. 25, 2006    (JP) ................... 2006-258995

(51) Int. Cl.
*G05D 23/00* (2006.01)
*F25B 29/00* (2006.01)

(52) U.S. Cl.
USPC ........... 165/288; 165/201; 165/289; 700/299; 700/300; 236/1 R; 236/1 C; 236/9 R; 236/91 R

(58) Field of Classification Search
USPC ................. 165/201, 287, 288, 289; 700/299, 700/300; 236/1 R, 1 C, 9 A, 9 R, 47, 91 R, 236/91 D, 91 F, 99 E
See application file for complete search history.

(56) References Cited

U.S. PATENT DOCUMENTS

| | | | | |
|---|---|---|---|---|
| 5,963,458 | A * | 10/1999 | Cascia | 700/300 |
| 6,818,012 | B2 * | 11/2004 | Ellingboe | 607/104 |
| 6,835,307 | B2 * | 12/2004 | Talbert et al. | 165/288 |
| 7,065,431 | B2 * | 6/2006 | Patterson et al. | 700/299 |
| 7,603,204 | B2 * | 10/2009 | Patterson et al. | 700/299 |

(Continued)

FOREIGN PATENT DOCUMENTS

| | | |
|---|---|---|
| JP | A-61-149761 | 7/1986 |
| JP | A-4-287203 | 10/1992 |

(Continued)

OTHER PUBLICATIONS

Office Action mailed Jun. 7, 2011 in corresponding JP application No. 2006-258995 (and English translation).

(Continued)

*Primary Examiner* — Ljiljana Ciric
(74) *Attorney, Agent, or Firm* — Posz Law Group, PLC

(57) ABSTRACT

A temperature control device includes an estimator that estimates the outlet temperature of fluid at an outlet of heating tanks to which no outlet temperature sensor is provided. The temperature control device includes a control unit. For a heating tank to which an outlet temperature sensor is provided, the control unit determines a manipulated variable on the basis of the outlet temperature which has been measured and an individual target temperature. For a heating tank to which no outlet temperature sensor is provided, the control unit determines a manipulated variable on the basis of the estimated temperature estimated by the estimator and an individual target temperature. The control unit controls the outlet temperature of the heating tanks on the basis of the manipulated variables.

10 Claims, 13 Drawing Sheets

U.S. PATENT DOCUMENTS

| | | | | |
|---|---|---|---|---|
| 7,730,947 | B2* | 6/2010 | Stegemeier et al. | 166/272.3 |
| 7,788,941 | B2* | 9/2010 | Campbell et al. | 62/259.2 |
| 7,845,411 | B2* | 12/2010 | Vinegar et al. | 166/302 |
| 7,881,831 | B2* | 2/2011 | Patterson et al. | 700/299 |
| 8,146,661 | B2* | 4/2012 | Bravo et al. | 166/265 |
| 2003/0093185 | A1* | 5/2003 | Patterson et al. | 700/299 |
| 2003/0093186 | A1* | 5/2003 | Patterson et al. | 700/299 |
| 2004/0158361 | A1* | 8/2004 | Patterson et al. | 700/299 |
| 2004/0225414 | A1* | 11/2004 | Patterson et al. | 700/300 |
| 2006/0190141 | A1* | 8/2006 | Patterson et al. | 700/299 |
| 2007/0191994 | A1* | 8/2007 | Patterson et al. | 700/299 |
| 2008/0128134 | A1* | 6/2008 | Mudunuri et al. | 166/302 |
| 2008/0135253 | A1* | 6/2008 | Vinegar et al. | 166/302 |
| 2008/0135254 | A1* | 6/2008 | Vinegar et al. | 166/303 |
| 2008/0142216 | A1* | 6/2008 | Vinegar et al. | 166/261 |
| 2008/0142217 | A1* | 6/2008 | Pieterson et al. | 166/272.6 |
| 2008/0217003 | A1* | 9/2008 | Kuhlman et al. | 166/245 |
| 2008/0217004 | A1* | 9/2008 | de Rouffignac et al. | 166/245 |
| 2008/0217015 | A1* | 9/2008 | Vinegar et al. | 166/302 |
| 2008/0217016 | A1* | 9/2008 | Stegemeier et al. | 166/303 |
| 2008/0236831 | A1* | 10/2008 | Hsu | 166/302 |
| 2008/0283246 | A1* | 11/2008 | Karanikas et al. | 166/302 |
| 2009/0189617 | A1* | 7/2009 | Burns et al. | 324/649 |
| 2009/0200022 | A1* | 8/2009 | Bravo et al. | 166/256 |
| 2010/0030396 | A1* | 2/2010 | Patterson et al. | 700/300 |
| 2010/0071890 | A1* | 3/2010 | LaWhite et al. | 165/287 |
| 2010/0195991 | A1* | 8/2010 | Deivasigamani et al. | 392/308 |
| 2012/0024517 | A1* | 2/2012 | Imanishi et al. | 165/287 |

FOREIGN PATENT DOCUMENTS

| | | |
|---|---|---|
| JP | A-06-250743 | 9/1994 |
| JP | A-08-207619 | 8/1996 |
| JP | A-11-062675 | 3/1999 |
| JP | A-11-063624 | 3/1999 |
| JP | A-11-083175 | 3/1999 |
| JP | A-11-099850 | 4/1999 |
| JP | A-11-202903 | 7/1999 |
| JP | A-11-338506 | 12/1999 |
| JP | A-2004-251620 | 9/2004 |
| JP | A-2005-148849 | 6/2005 |

OTHER PUBLICATIONS

International Search Report mailed on Jan. 22, 2008 for the corresponding International patent application No. PCT/JP2007/068395 (English translation enclosed).

* cited by examiner

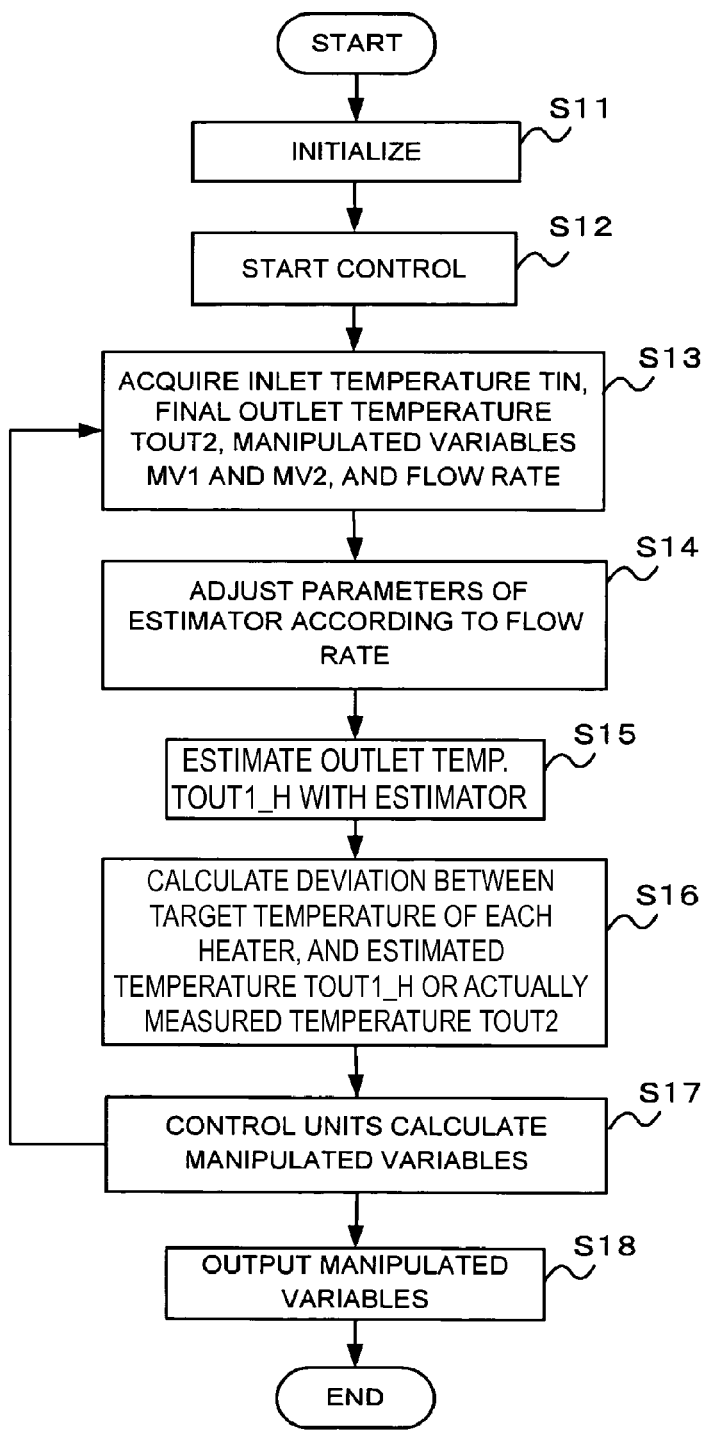

DEVICE AND METHOD FOR ADJUSTING TEMPERATURE OF FLUID

CROSS REFERENCE TO RELATED APPLICATIONS

This application is a U.S. national stage application of PCT/JP2007/068395 filed on Sep. 21, 2007, and claims priority to, and incorporates by reference, Japanese Patent Application No. 2006-258995 filed on Sep. 25, 2006.

TECHNICAL FIELD

The present invention relates to a temperature control device for a fluid, which perform temperature control so that the fluid is kept at a predetermined target temperature.

BACKGROUND ART

A temperature control device for a fluid, which comprises a plurality of heating tanks, and which applies heat to fluid in these heating tanks, is per se known (for example, refer to Patent Document #1). With this type of temperature control device, a temperature sensor is provided to the outlet of each of the heating tanks, the outlet temperatures which have been measured are fed back with respect to a target temperature, and thereby control to the target temperature is performed with good accuracy.

Furthermore, as described in Patent Document #2, there is a temperature control device which only controls the outlet temperature of the heating tank which is farthest downstream, but does not perform temperature control for the other heating tanks, rather keeping the outputs of their heaters fixed.
[Patent Citation 1]
Japanese Laid-Open Patent Publication Heisei 11-83175
[Patent Citation 2]
Japanese Laid-Open Patent Publication Heisei 6-250743

DISCLOSURE OF THE INVENTION

Technical Problem

With a temperature control device as described in Patent Document #1, it is necessary to provide the same number of temperature sensors as heating tanks, and it is not possible to avoid increase of cost. Moreover, due to the number of components increasing, the possibility of the occurrence of a fault rises to the same extent, and the maintenance cost also is increased.

Moreover, with a temperature control device as described in Patent Document #2, since it is only possible to perform temperature control for that heating tank which is farthest downstream, accordingly, there is limited scope for control of the apparatus as a whole.

Thus the object of the present invention is, for a temperature control device for a fluid, to reduce the number of temperature sensors, without losing any freedom of control.

Technical Solution

The temperature device (1) for a fluid according to an embodiment of the present invention comprises: a plurality of fluid reservoir units (15) which are arranged in series, parallel, or a combination thereof partway along a conduit through which fluid flows, and which comprise heat application or cooling means; an outlet temperature sensor (16) which is provided to an outlet of one of said plurality of fluid reservoir units; an inlet temperature sensor (14) which measures the inlet temperature of the fluid which flows into said temperature control device; an acquisition means (51) which acquires individual target temperatures, which are target temperatures for the fluid at the outlets of each of said plurality of fluid reservoir units; an estimation means (6) which modelizes said fluid reservoir units having said heat application or cooling means, and which estimates the outlet temperature of the fluid at the outlet of a fluid reservoir unit, among said plurality of fluid reservoir units, to which no said outlet temperature sensor is provided; and a control means (51) which: determines an manipulated variable for the fluid reservoir unit to which said outlet temperature sensor is provided, on the basis of its said outlet temperature which has been measured and its said individual target temperature; determines an manipulated variable for a fluid reservoir unit to which no said outlet temperature sensor is provided, on the basis of its said estimated temperature which has been estimated by said estimation means and its said individual target temperature; and controls the outlet temperatures of said fluid reservoir units by operating said heat application or cooling means on the basis of said manipulated variables which have been determined.

In a preferred embodiment, if said plurality of fluid reservoir units are arranged in series partway along said fluid flow conduit, only one said outlet temperature sensor may be provided, in the neighborhood of the outlet of that fluid reservoir unit which is most downstream.

In a preferred embodiment, there may be further provided a flow rate sensor (13) which measures the flow rate per unit time of the fluid which flows through said plurality of fluid reservoir units, and parameters may be determined for said estimation means according to the flow rate measured per unit time measured by said flow rate sensor.

In a preferred embodiment, said estimation means may further perform estimation of a disturbance applied to said fluid reservoir units having said heat application or cooling means.

In a preferred embodiment, said estimation means may estimate individual disturbances applied to each of said fluid reservoir units having said heat application or cooling means; and said control means: may correct the manipulated variables of each of said heat application or cooling means by said individual disturbances; may control the outlet temperatures of said fluid reservoir units by operating said heat application or cooling means, on the basis of said manipulated variables which have been corrected; and may estimate temperature on the basis of said manipulated variables which have been corrected.

In a preferred embodiment, said estimation means, along with having a model of said plurality of fluid reservoir units which possess said heat application and cooling means and all of which have a same dynamical characteristic, also may be adapted to make the correction amounts which are applied to the manipulated variables of the model of said fluid reservoir units having said heat application or cooling means, all to become equal.

In a preferred embodiment, said estimation means, along with having a model of said plurality of fluid reservoir units which possess said heat application and cooling means and all of which have a same dynamical characteristic, also may assume that the same disturbance is applied to said plurality of fluid reservoir units which possess said heat application and cooling means and performs estimation of said disturbance.

And the temperature control method for a fluid according to another embodiment of the present invention comprises: a step of acquiring individual target temperatures, which are target temperatures for the fluid at the outlets of each of a plurality of fluid reservoir units (15) which are arranged in series, parallel, or a combination thereof partway along a conduit through which fluid flows, and which are provided with heat application or cooling means; a step of measuring the inlet temperature of the fluid which flows into said temperature control device; a step of measuring the outlet temperature of the fluid at the outlet of one of said plurality of fluid reservoir units, among said plurality of fluid reservoir units; a step of estimating the outlet temperature of the fluid at the outlet of a fluid reservoir unit to which no said outlet temperature sensor is provided, using an estimator (6) which modelizes said fluid reservoir units having said heat application or cooling means; a step of determining an manipulated variable for the fluid reservoir unit whose said outlet temperature is measured, on the basis of its said outlet temperature which has been measured and its said individual target temperature; a step of determining an manipulated variable for a fluid reservoir unit whose said outlet temperature is not measured, on the basis of its said estimated temperature which has been estimated and its said individual target temperature; and a step of controlling the outlet temperatures of said fluid reservoir units by operating said heat application or cooling means on the basis of said manipulated variables which have been determined.

BRIEF DESCRIPTION OF THE DRAWINGS

FIG. 13 is a flow chart showing the sequence of processing performed by the temperature control devices 1 according to these embodiments.

BEST MODES FOR CARRYING OUT THE INVENTION

In the following, a temperature control device for a fluid according to an embodiment of the present invention will be explained with reference to the drawings.

Figure 1:
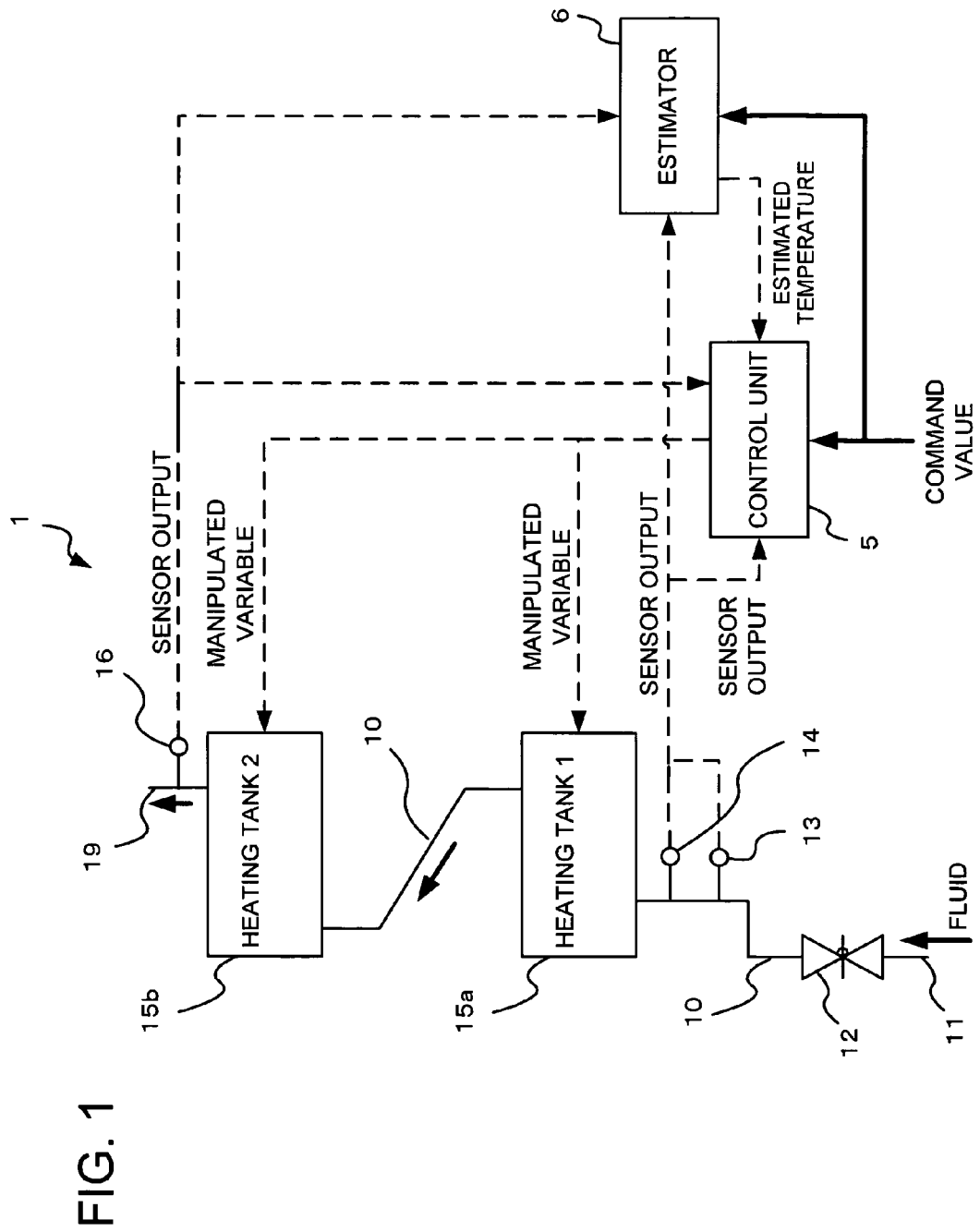
FIG. 1 is a figure schematically showing the structure of a temperature control device 1 according to an embodiment of the present invention.

FIG. 1 is a figure schematically showing the structure of a temperature control device 1 according to an embodiment.

This temperature control device 1 comprises first and second heating tanks 15a and 15b which are fluid reservoirs and which perform application of heat, a control unit 5 which performs control of these heating tanks 15a and 15b, and an estimator which modelizes the heating tanks 15a and 15b.

First, to explain the flow of fluid, in this embodiment, the heating tanks 15a and 15b are arranged in series, with the first heating tank 15a being below the second heating tank 15b. And the fluid flows in from a flow inlet 11 which is provided below the first heating tank 15a. Moreover, this fluid which has flowed in flows upward through a flow conduit 10 towards the first and second heating tanks 15a and 15b. And the fluid which has been heated by the first and second heating tanks 15a and 15b flows out from a flow outlet 19 which is provided above the second heating tank 15b.

A flow rate adjustment valve 12 is provided in the flow conduit in the neighborhood of the flow inlet 11, for adjusting the flow rate of the flowing in fluid. Between this flow rate adjustment valve 12 and the first heating tank 15a, there are provided a flow rate sensor 13 and an inlet temperature sensor 14.

The fluid which flows out from the second heating tank 15b is discharged from the flow outlet 19 to the exterior. An outlet temperature sensor 16 is provided in the neighborhood of the flow outlet 19. But no outlet temperature sensor is provided in the flow conduit 10 which joins the first heating tank 15a and the second heating tank 15b. The fluid temperature at the outlet of the first heating tank 15a is estimated by the estimator 6. In other words, a temperature sensor is only provided at the outlet of one of the heating tanks 15, while the temperature is estimated for the heating tank 15 to the outlet of which no temperature sensor is provided.

The outputs of the sensors 13, 14, and 16 are inputted to the control unit 5 and to the estimator 6. The control unit 5 performs temperature control of the heating tanks 15a and 15b on the basis of the outputs of the sensors 13, 14, and 16, a command value from a higher level device, and the result of estimation by the estimator 6. The details of the control unit 5 and of the estimator 6 will be described hereinafter.

It should be understood that while, in this embodiment, a case is explained in which, as the temperature control for the fluid, heat is applied to the fluid, the present invention could also be applied to a case in which a fluid is cooled, or to a case in which both heating and cooling of a fluid are performed.

Figure 14A:
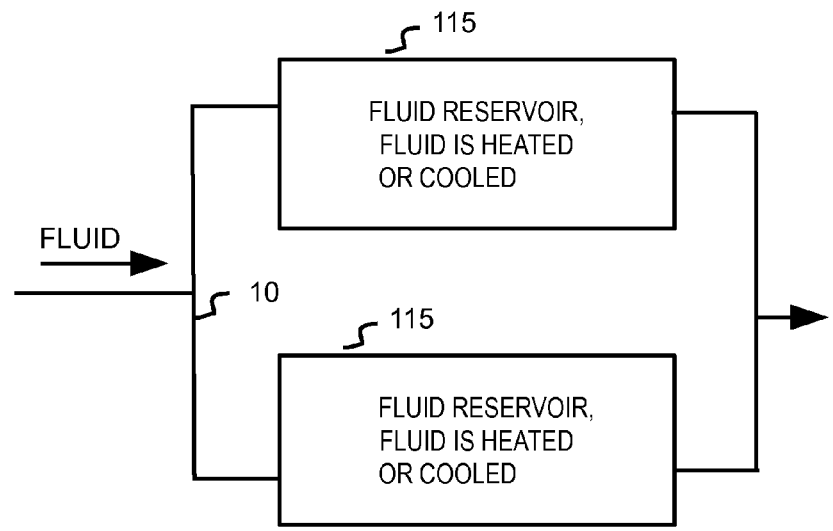
FIGS. 14A and 14B are figures schematically showing fluid reservoir units arranged in parallel and in a combination of series and parallel, respectively.
Figure 14B:
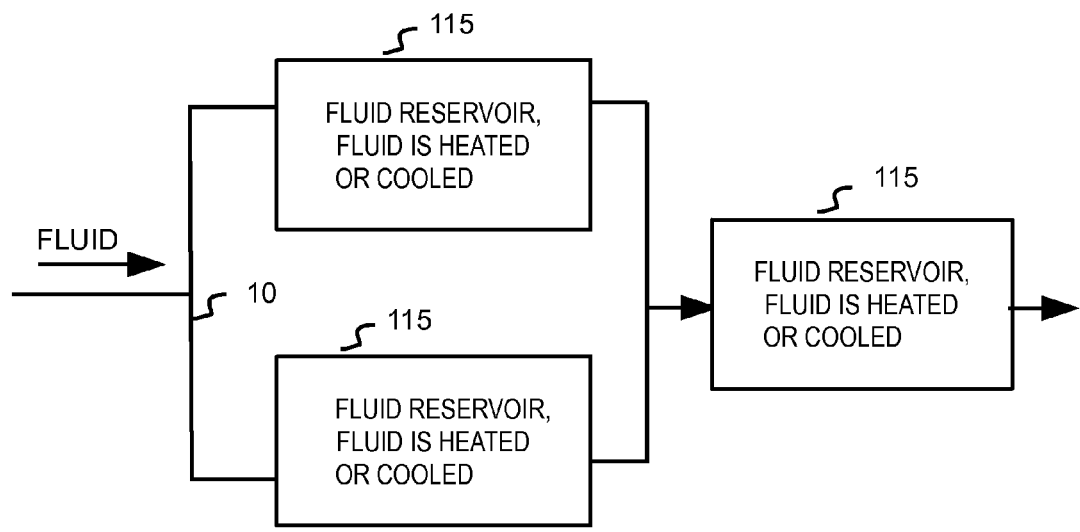

Moreover, while in this embodiment, two heating tanks are connected in series, so that a two-stage structure is employed, it would also be acceptable for the number of stages to be three or more. Furthermore, a plurality of heating tanks could also be connected in parallel, or could be connected in a combination of series and parallel. FIG. 14A illustrates a plurality of fluid reservoir units 115 arranged in parallel, and FIG. 14B illustrates a plurality of fluid reservoirs 115 arranged in a combination of series, and parallel.

Yet further while, in this embodiment, a temperature sensor is only provided to the outlet of the heating tank which is furthest downstream, it would also be acceptable to provide a temperature sensor to the outlet of some other heating tank, provided that observability, which is a condition for the estimator to be effective, is satisfied.

Figure 2:
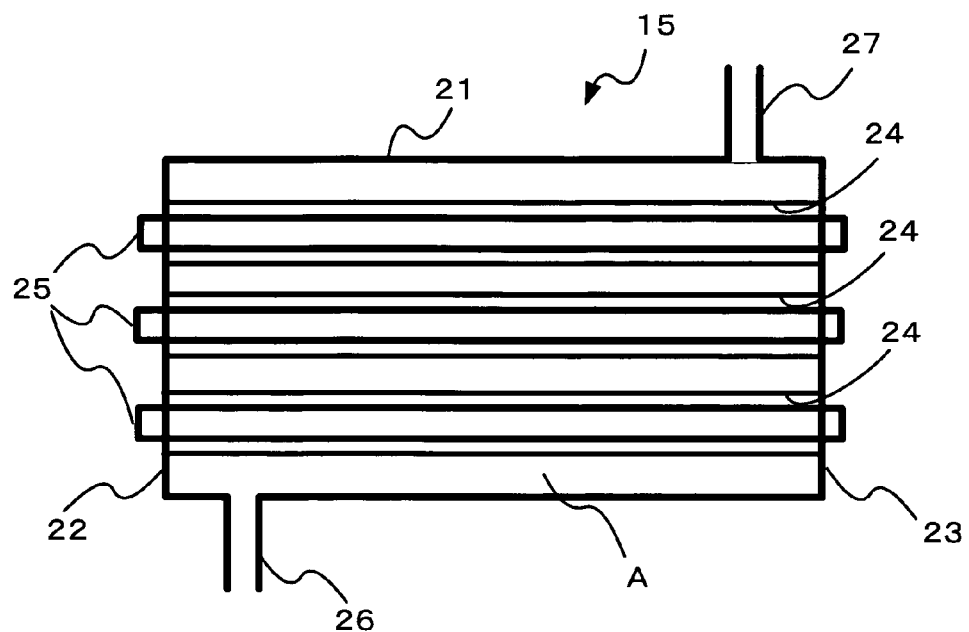
FIG. 2 is a vertical sectional view of a heating tank 15.
Figure 3:
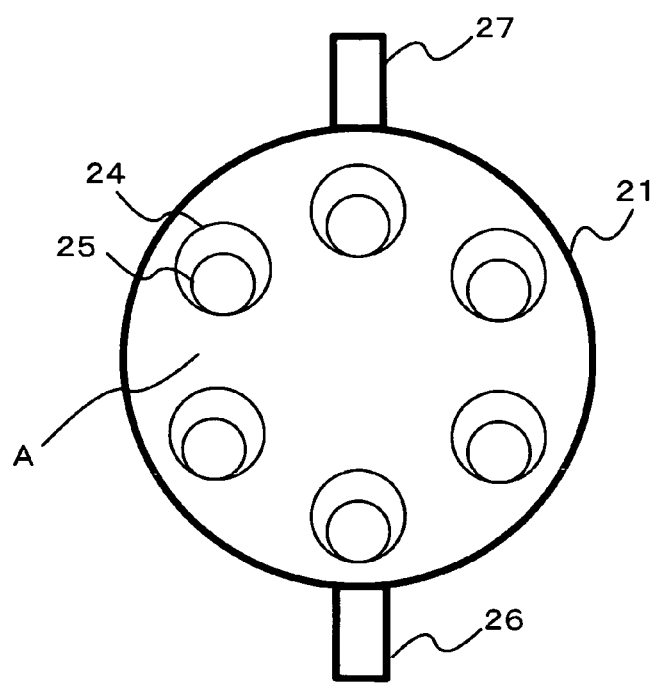
FIG. 3 is a horizontal sectional view of the heating tank 15.

FIGS. 2 and 3 are figures showing an example of the structure of one of the heating tanks 15. Here, the first and second heating tanks 15a and 15b have a same structure, so that, when there is no particular need to distinguish between them, reference will simply be made to a "heating tank 15".

FIG. 2 is a vertical sectional view of the heating tank 15, while FIG. 3 is a horizontal sectional view thereof.

This heating tank 15 is formed with a hollow tubular body 21, and both ends 22 and 23 of this body 21 are sealed. The body 21 may be made, for example, of glass. Moreover, six pipes 24, 24, . . . are formed to extend within the body 21 along its longitudinal direction. A rod shaped heater 25, 25, . . . is inserted into each of the pipes 24, for applying heat to fluid within the body 21. These heaters 25, 25, . . . may be, for example, halogen lamps. An inlet conduit 26 and an outlet conduit 27 are provided upon the sides of the body 21. The inlet conduit 26 is provided at one end portion of the body 21, while the outlet conduit 27 is provided at its other end portion. Moreover the arrangement is such that, when the inlet conduit 26 is pointing downwards, the outlet conduit 27 is pointing upwards.

With the heating tank 15 having the structure described above, when it is arranged so that the inlet conduit 26 points downwards, fluid which has flowed into the body 21 from the inlet conduit 26 accumulates in the interior A of the body. At this time, heat is applied by the heaters 25 to the fluid within the interior A of the body, so that it comes to flow out from the outlet conduit 27 which is pointing upwards. And, in this embodiment, two of this type of heating tank are connected in series, so that heat is gradually applied to the fluid.

Figure 4:
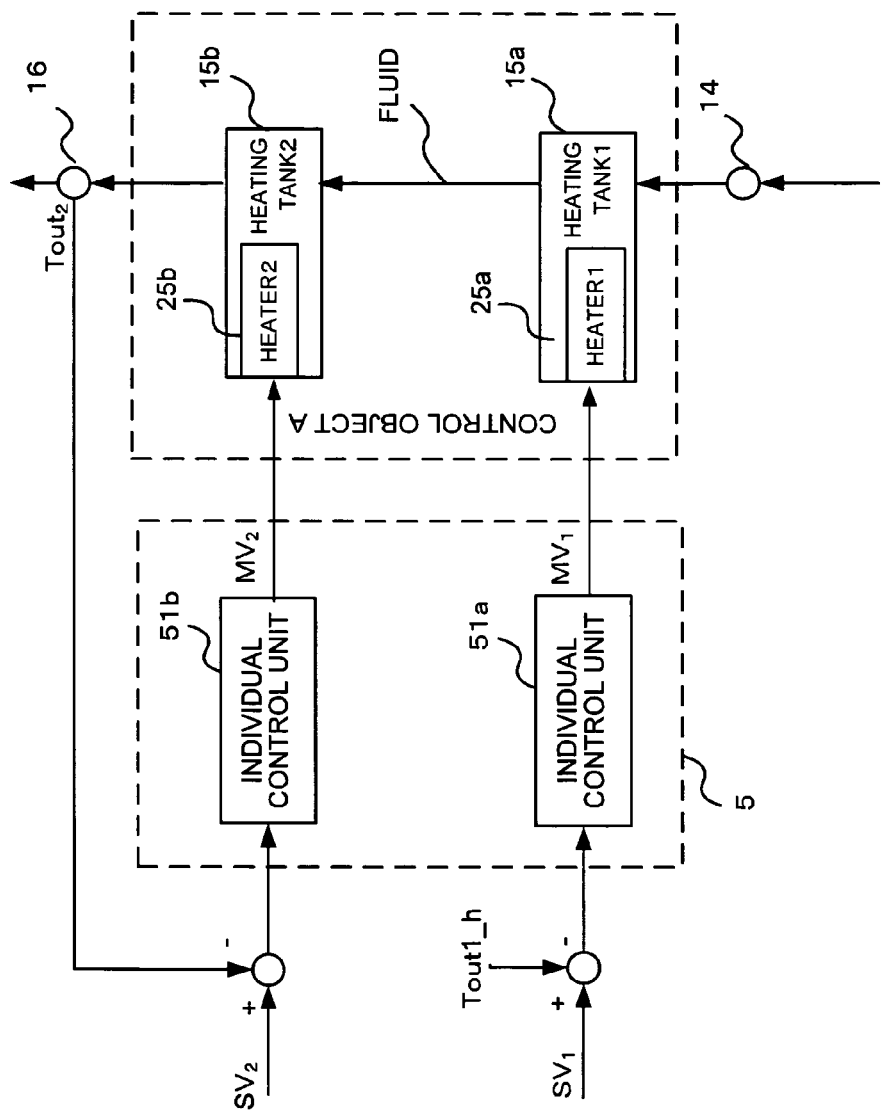
FIG. 4 is a block diagram of a temperature control device 1 according to a first embodiment.
Figure 5A:
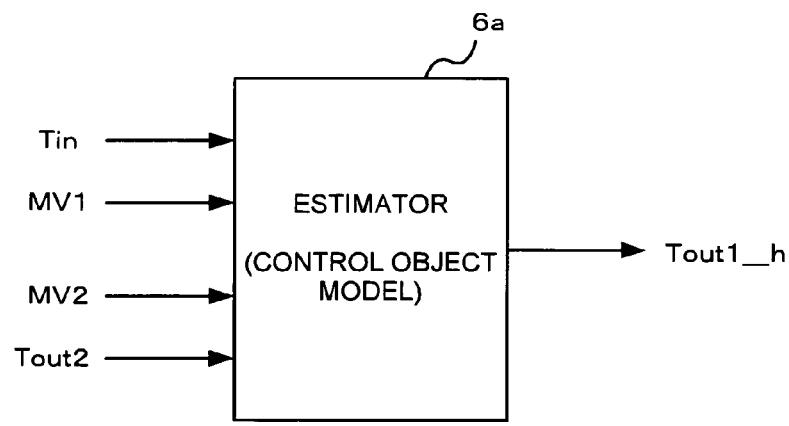
FIG. 5 is a block diagram of an estimator 6a according to the first embodiment.

FIG. 4 is a block diagram of a temperature control device 1 according to a first embodiment, and FIG. 5 is a block diagram of an estimator 6a according to the first embodiment.

As shown in FIG. 4, the control unit 5 comprises two individual control units 51a and 51b, and these have as their control objects the heaters 25a and 25b which apply heat to the heating tanks 15a and 15b and to the fluid in their interiors.

The difference between a target temperature SV1 for the fluid which is being heated in the heating tank 15a, and a temperature Tout1_h which is estimated by the estimator 6a, is provided as an input signal to the individual control unit 51a. And the individual control unit 51a outputs an manipulated variable MV1 on the basis of this input signal, and thereby operates the heaters 25a which are in the heating tank 15a on the upstream side.

And the difference between a target temperature SV2 for the fluid which is being heated in the heating tank 15b, and an actual temperature Tout2 which is measured by the outlet temperature sensor 16, is provided as an input signal to the individual control unit 51b. And the individual control unit 51b outputs an manipulated variable MV2 on the basis of this input signal, and thereby operates the heaters 25b which are in the heating tank 15b on the downstream side.

Figure 5B:
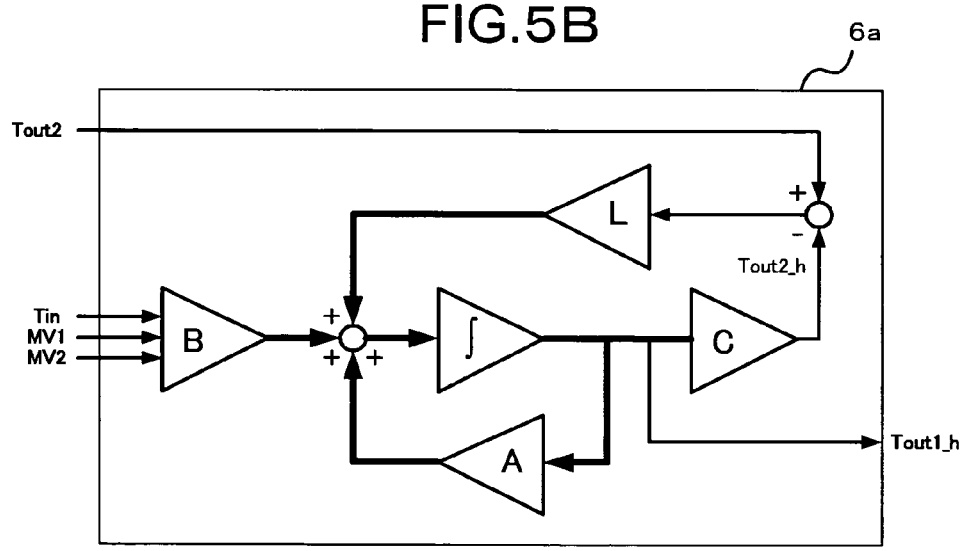

As shown in FIG. 5, the estimator 6a according to this embodiment takes as inputs the inlet temperature Tin, the manipulated variables MV1 and MV2, and the actually measured outlet temperature Tout2 of the heating tank 15b, and outputs the estimated value Tout1_h for the outlet temperature of the heating tank 15a. A block diagram of this estimator 6a is shown in FIG. 5B. In this figure, it is shown that it is possible to estimate the outlet temperatures Tout1_h and Tout2_h by appropriately determining the model parameters A, B, and C of the estimator 6a, and the estimator gain L.

According to this embodiment, it is possible to estimate the outlet temperatures and to control the fluid temperatures, even if a portion of the sensors which detect the outlet temperatures of the heating tanks are omitted.

An explanation of the estimator 6a according to this embodiment using general formulas is as follows.

A model of a control object with m inputs and l outputs is given by the following Equation (1):

$$\dot{x} = Ax + Bu$$

$$y = Cx$$

$$x: n \times 1 \; A: n \times n \; B: n \times m \; C: l \times n \quad (1)$$

Here, if (C,A) is observable, then the estimator can be constructed, and, if the estimated value of x is termed x_h, this is given by Equation (2):

$$\dot{x}\_h = Ax\_h + Bu + K(y - Cx\_h) \quad (2)$$

Now, when the outlet temperature Tout_h is estimated using an estimator like that of the first embodiment, it is difficult to determine the model parameters for the estimator 6 so that they agree perfectly with the actual parameters of the control object, and accordingly modelization errors are present. Furthermore, sometimes a disturbance of one kind or another is also superimposed upon an actual control object. In this type of case, the estimator is not able to estimate the correct temperature, so that, since the control unit is adapted to track the estimated temperature, in which the error is included, to the target temperature, sometimes it is the case that some offset with respect to the final target temperature remains, which is undesirable. Thus, in the second through the fourth embodiments explained below, when designing the estimator 6, a technique is employed which can eliminate such an offset, even if precise agreement with the model parameters is not obtained.

In the second embodiments, the structure of the estimator is different from that in the first embodiment. In other words, in the second embodiment, the modelization errors and the actual disturbances are considered together as "virtual disturbances", and they mutually cancel one another by subtraction. The fundamental way of thinking will be explained using FIG. 6.

Figure 6:
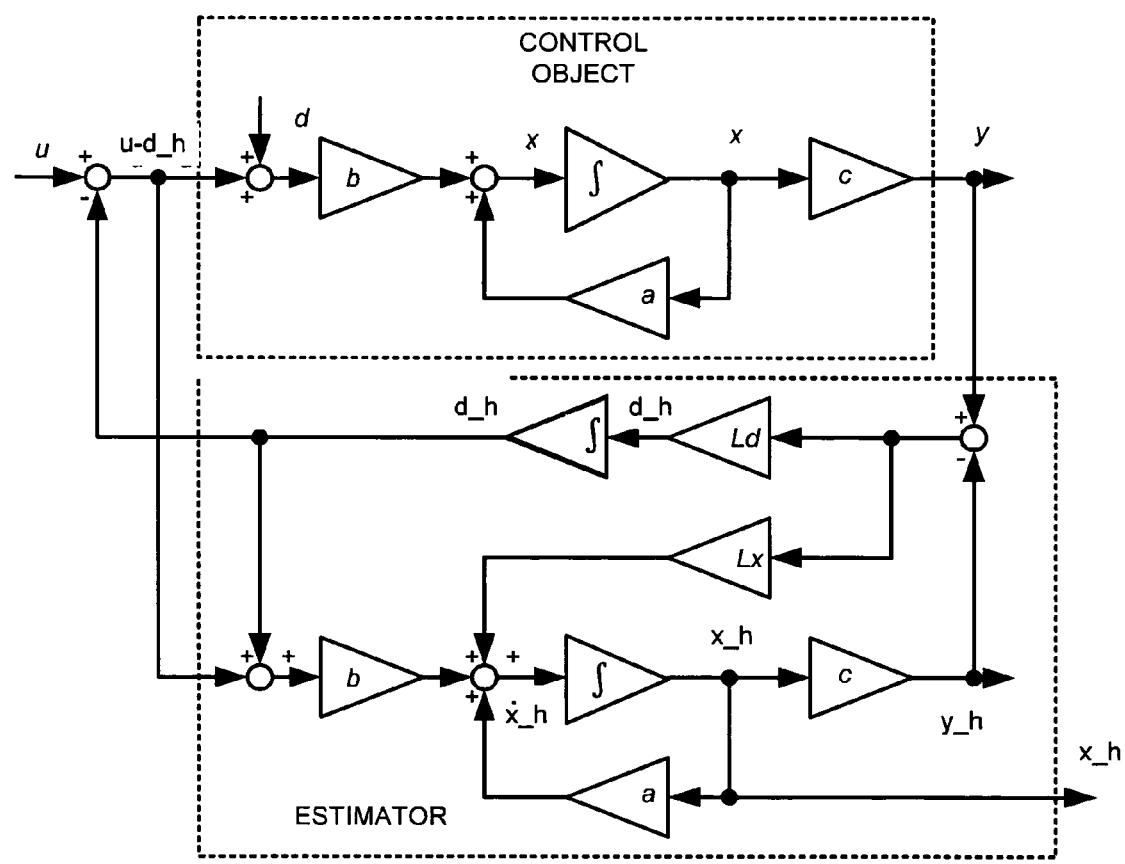
FIG. 6 is an explanatory figure showing the design objective of a second embodiment.

To show a general block diagram of the control object and the estimator when it is supposed that a disturbance is present, this is given in FIG. 6. Here, when it is supposed that a virtual disturbance is added stepwise to the control object input, and a model is constructed which takes this virtual disturbance into consideration, the estimator is able to perform estimation of the temperature and estimation of the disturbance simultaneously. In this block diagram, by subtracting the disturbance d_h which has been estimated by the estimator from the input signal u, the disturbance which is added to the control object and the estimator model mutually cancel out one another, and the control object exhibits equivalent behavior to the estimator model, so that it is possible to estimate an accurate outlet temperature.

Figure 7:
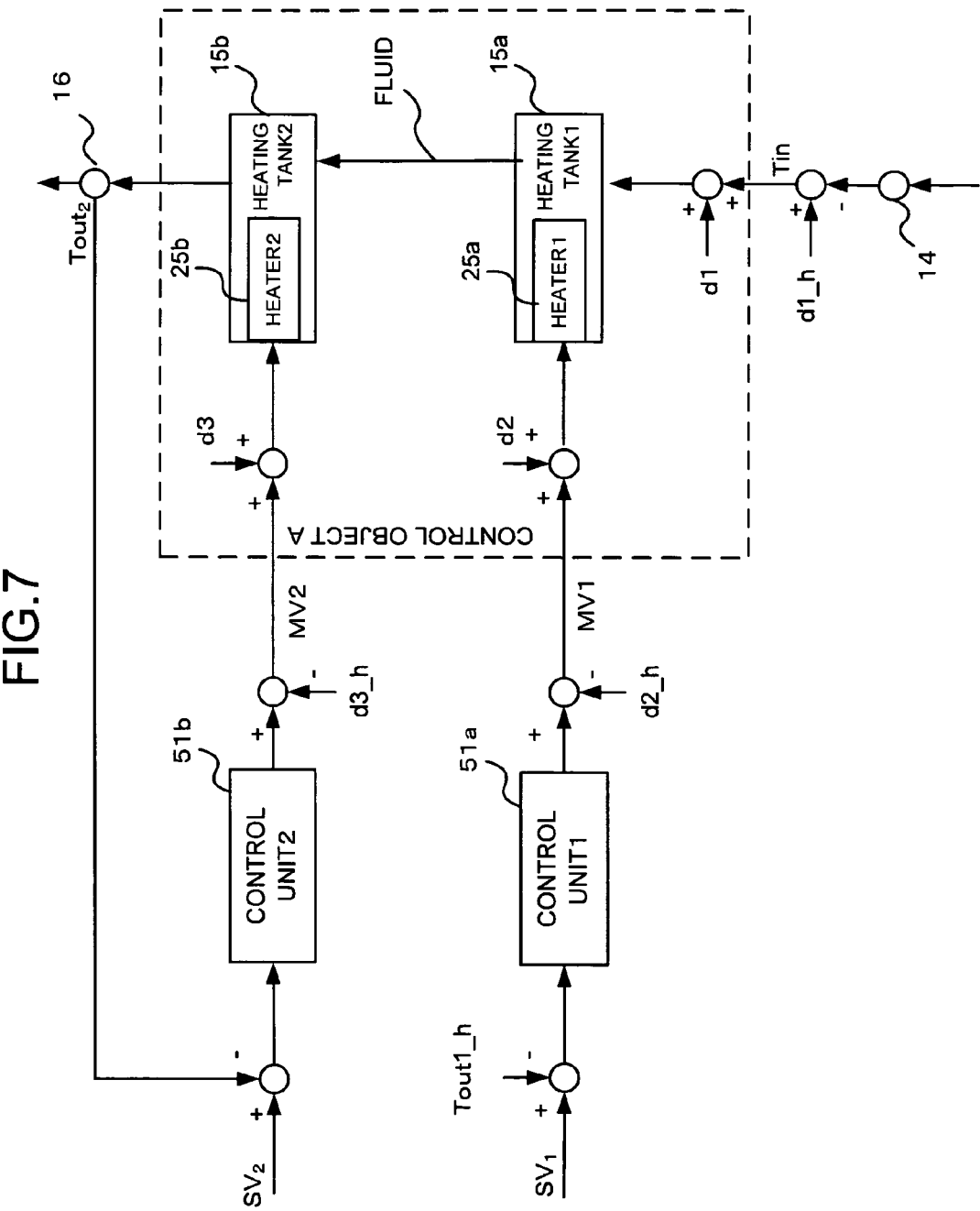
FIG. 7 is a block diagram of a temperature control device 1 according to a second embodiment.
Figure 8A:
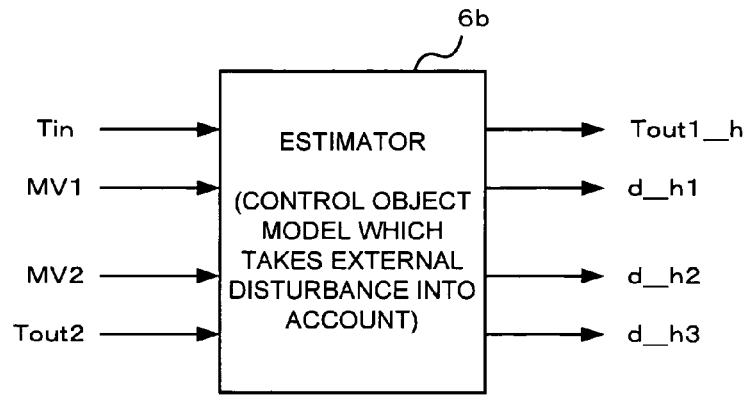
FIG. 8 is a block diagram of an estimator 6a [sic] according to the second embodiment.

FIGS. 7 and 8 have been designed on the basis of the above described type of approach, and are, respectively, a block diagram of a temperature control device 1, and a block diagram of an estimator 6b, according to the second embodiment.

Figure 8B:
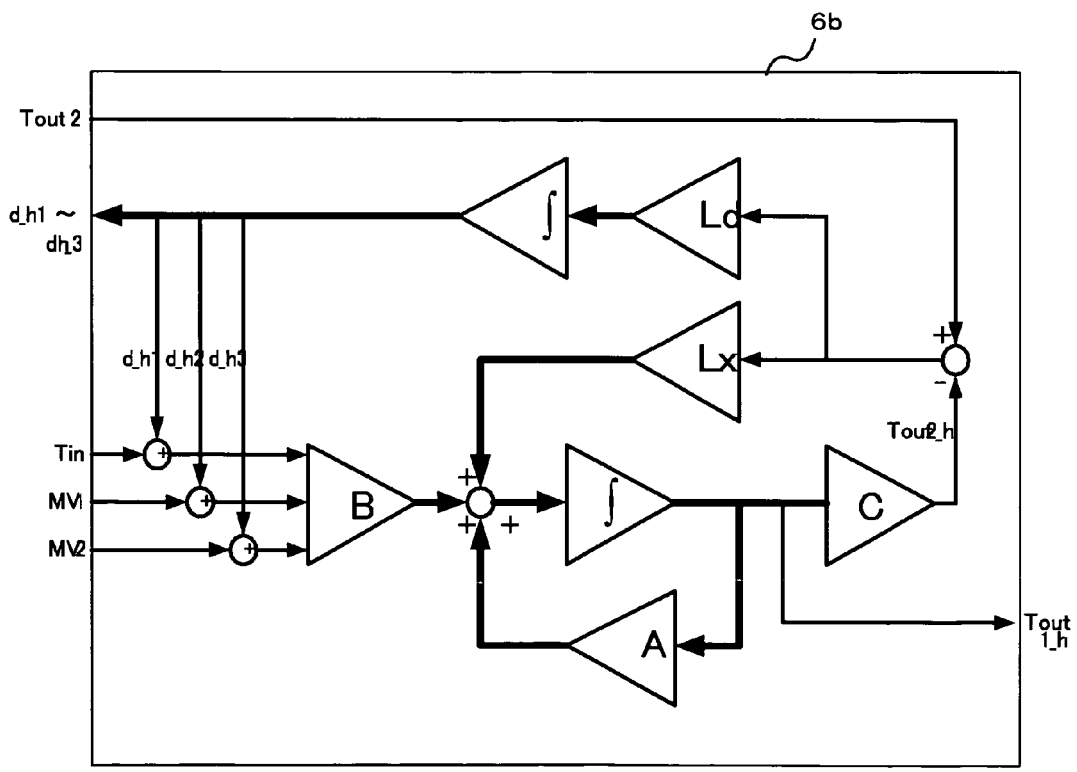

In other words, as shown in FIG. 7, for the control object A, it is hypothesized that virtual disturbances d1 through d3 are respectively present for the input temperature Tin and the manipulated variables MV1 and MV2 from the individual control units 51a and 51b. Thus, the estimator 6b shown in FIG. 8 estimates the outlet temperatures Tout1_h and Tout2_h for the outlets of the heating tanks 15 in a similar manner to the case of the first embodiment. Moreover, in addition thereto, the estimator 6b of this embodiment also estimates the respective disturbances d1_h through d3_h. And, as shown in FIG. 8b, the disturbances which have been estimated are added, within the estimator 6b, to the input temperature Tin and the manipulated variables MV1 and MV2. Furthermore, the values obtained by subtracting the estimated disturbances d1_h through d3_h from the input temperature Tin and the manipulated variables MV1 and MV2 from the individual control units 51 become corrected manipulated variables for the actual control object A.

Due to this, the modelization error and the disturbance are canceled, and it is possible to estimate the outlet temperature of the heating tank 15a accurately, so that, as a result, in this embodiment as well, it is possible to control the fluid to the target temperature in a more simple and accurate manner.

An explanation of the estimator 6b according to this embodiment using general formulas is as follows.

A model of a control object with m inputs and l outputs is given by Equation (1) above.

Here, if it is considered that stepwise disturbances $d(m \times 1) = [d_1 \; d_2 \; \ldots \; d_m]^T$ are added to all of the inputs, then an augmented system which includes the disturbances in the model is given by Equations (3) and (4):

$$\dot{x} = Ax + Bu + Bd \quad (3)$$

$$\begin{bmatrix} \dot{x} \\ \dot{d} \end{bmatrix} = \begin{bmatrix} A & B \\ 0 & 0 \end{bmatrix} \begin{bmatrix} x \\ d \end{bmatrix} + \begin{bmatrix} B \\ 0 \end{bmatrix} u \quad (4)$$

$$y = [C \; 0] \begin{bmatrix} x \\ d \end{bmatrix}$$

$$\begin{bmatrix} A & B \\ 0 & 0 \end{bmatrix} : (n+m) \times (n+m)$$

$$\begin{bmatrix} B \\ 0 \end{bmatrix} : (n+m) \times m$$

$$[C \; 0] : l \times (n+m)$$

Here, if $$\left( [C \; 0], \begin{bmatrix} A & B \\ 0 & 0 \end{bmatrix} \right)$$

is observable, then the estimator can be constructed, and, if the estimated values of x and d are termed x_h and d_h respectively and estimator gains are termed Lx and Ld, these are given by Equation (5):

$$\begin{bmatrix} \dot{\hat{x}} \\ \dot{\hat{d}} \end{bmatrix} = \begin{bmatrix} A & B \\ 0 & 0 \end{bmatrix} \begin{bmatrix} \hat{x} \\ \hat{d} \end{bmatrix} + \begin{bmatrix} B \\ 0 \end{bmatrix} u + \begin{bmatrix} Lx \\ Ld \end{bmatrix} \left( y - [C \; 0] \begin{bmatrix} \hat{x} \\ \hat{d} \end{bmatrix} \right) \quad (5)$$

Here, the model parameters A, B, and C and the estimator gain L can all be given as functions of the flow rate. Accordingly, the model parameters A, B, and C and the estimator gain L are determined on the basis of the inflow amount per unit time, as measured by the flow rate sensor 13. This is the same for all of the embodiments.

Next, the third embodiment will be explained.

In this embodiment, for example, a case is considered in which a plurality of heating tanks are connected in series, and heat is applied in each heating tank to an individual target value having the same temperature elevation ΔT° C. For example, with a temperature control device having a structure like that shown in FIG. 4, this is a case in which the inlet temperature is 20° C., the target temperature of the heating tank 15a is 30° C., and the target temperature of the heating tank 15b (i.e. the final target temperature) is 40° C. At this time, it is necessary for the control unit 5 to output equal operational amounts to the heaters 25a and 25b, so that the heaters 25a and 25b are operated in the same manner.

However, when there is an error in the estimation value of the outlet temperature of the heating tank 15a, the manipulated variables for the heaters 25a and 25b vary unpredictably, and, as a result, sometimes it happens that it is not possible to reach the final target temperature, but an offset remains. For example, if the case of applying heat with two heaters is considered, although the downstream heater 25b may be applying heat at an output of 100%, the temperature of the fluid may not arrive at the final target temperature. At this time, if the estimated temperature of the upstream heater 25a (which includes the error) arrives at its target temperature while it is outputting at an output of 80% (which is undesirable), then the upstream heater 25a may be maintained at this output of 80% without change, and it will not possible for it to apply yet further heating, even though it still has a remaining capacity of 20%.

Figure 9:
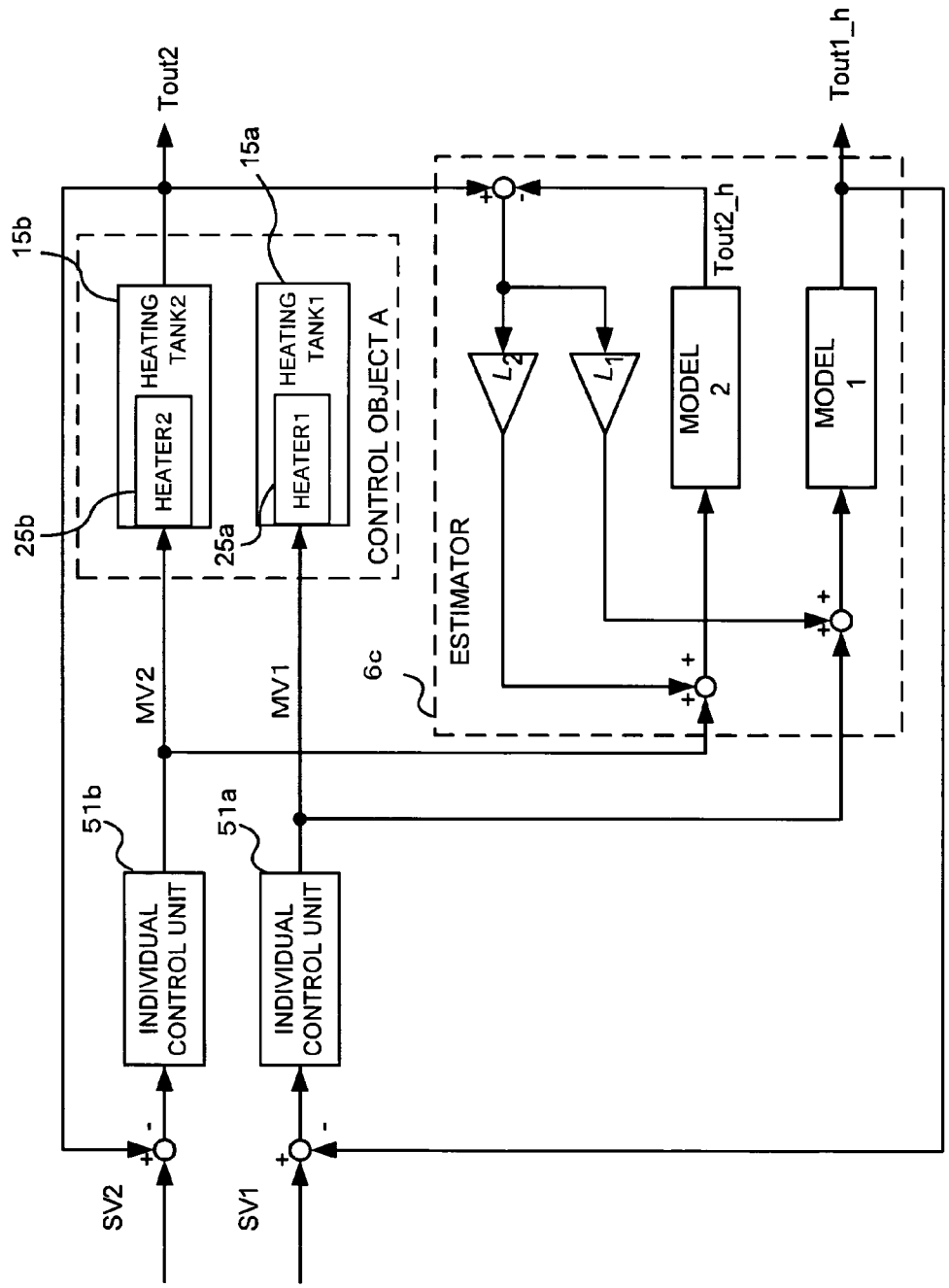
FIG. 9 is a block diagram of a temperature control device 1 according to a third embodiment.

Thus, in this embodiment, the estimator 6c like that shown in the block diagram of FIG. 9 is designed to conditions of the following type. That is, in this embodiment, attention is given to the aspect that, when the rise of the temperatures applied by the plurality of heating tanks 15a and 15b are equal, it is necessary always to make the manipulated variables MV1 and MV2 which are supplied to the heaters 25a and 25b equal. In other words, in this embodiment, along with modelizing (with models 1 and 2) all of the heating tanks to have the same dynamical characteristics, the estimator is designed so as to estimate the same temperatures for the same manipulated variables.

As a result, if the actual outlet temperature and the estimated temperature do not agree with one another, and correct operation is to be provided, since the same correct operation is provided to the models for all of the heating tanks, accordingly the same temperatures always come to be estimated for the same inputs. Accordingly, the manipulated variables always come to be the same, and it is possible to eliminate any offset.

In other words, the above described design objective means designing so that, in the block diagram of FIG. 9, the gains $L_1$ and $L_2$ become equal. By doing this, although an error may remain as much as before in the outlet temperature Tout1_h which is estimated, since models of heating tanks 15a and 15b are the same and also the same amount of error correction is performed, accordingly the manipulated variables MV1 and MV2 for the heaters 25a and 25b become equal. As a result, it becomes possible to cancel the offset from the final target temperature, and it is possible to control the fluid to the target temperature more simply and also more accurately.

It should be understood that a block diagram for the temperature control device 1 according to the third embodiment, and a block diagram of the estimator 6, are respectively the same as those for the first embodiment shown in FIGS. 4 and 5, and the gain of the estimator is determined as described above.

An explanation of the estimator 6c according to this embodiment using general formulas is as follows.

A model of a control object with m inputs and l outputs is given by Equation (1) above. Here, if (C,A) is observable, then the estimator can be constructed, and, if the estimated value of x is termed x_h, this is given by Equation (6):

$$\dot{x}\_h = Ax\_h + Bu + L(y - Cx\_h) \quad (6)$$

Here, when $$\text{input } u = [T_{in} \; MV_1 \; MV_2 \ldots MV_{m-1}]^T \quad (7)$$

$$\text{and the estimator gains are } L = [[L_1 \; L_2 \ldots L_{m-1}]^T \quad (8)$$

then the design is so arranged that the estimator gains are equal:

$$L_2 = L_3 = \ldots = L_{m-1} \quad (9)$$

Next, the fourth embodiment will be explained. This embodiment is an embodiment in which a further disturbance is inputted to the manner of thinking of the third embodiment.

Figure 10:
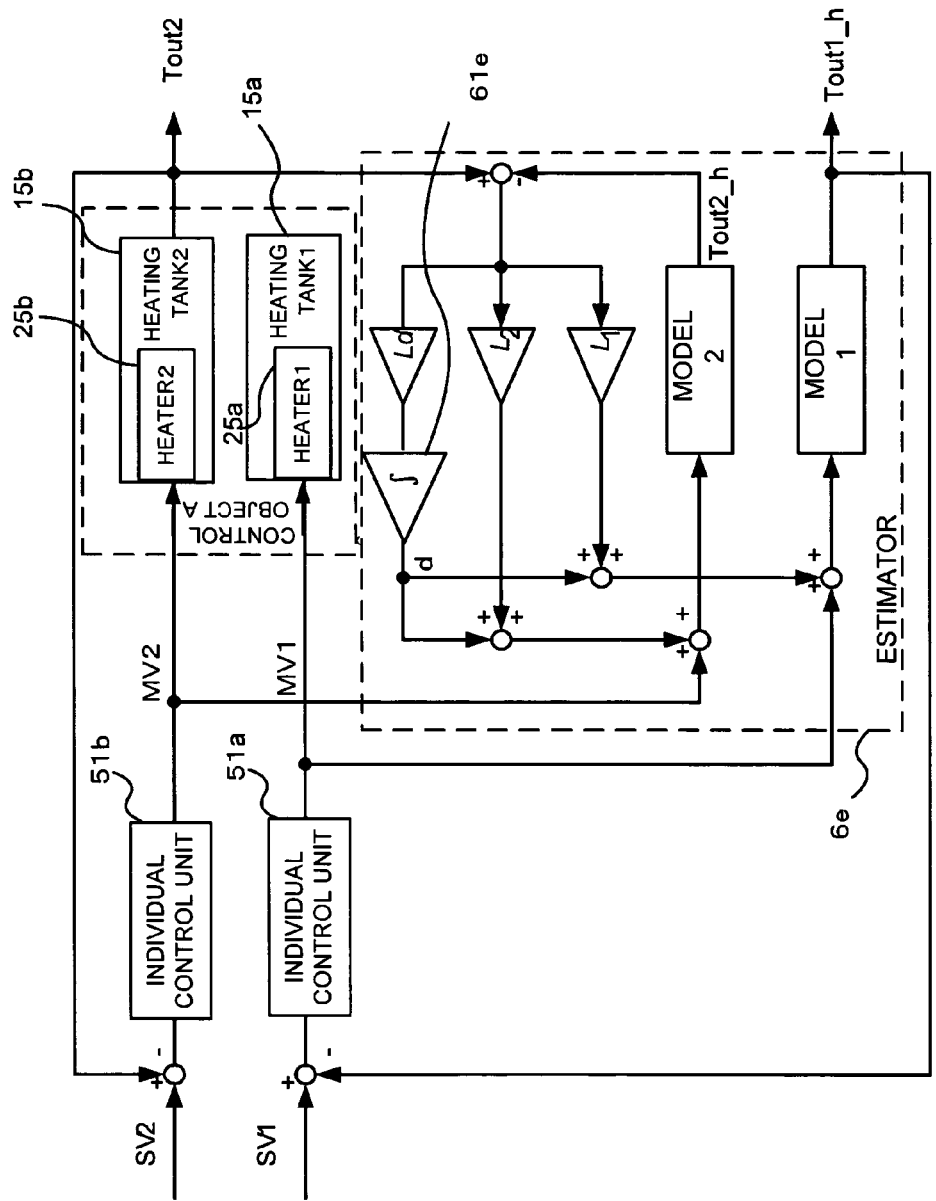
FIG. 10 is a block diagram of a temperature control device 1 according to a fourth embodiment.

FIG. 10 is a block diagram showing a control object and an estimator 6e according to this fourth embodiment. In other words, this embodiment is one in which it is hypothesized that equal virtual disturbances d are added to the inputs of all of the control objects, and each of the heating tanks 15a and 15b is modelized and its outlet temperature and disturbance are estimated. What is very important here is the point that, by contrast with the third embodiment in which the correction term was only feeding back of the estimation error due to the estimator gain, in this embodiment, the integration element 61e is added to the correction term by estimating the disturbance.

Due to this, in this embodiment, since the corrections to the manipulated variables for the two models 1 and 2 on the basis of the integrated values of this estimation error are equal, accordingly the labor for designing the system so that the estimator gains should become the same, as was the case with the third embodiment, becomes unnecessary. It should be understood that, in this embodiment, the virtual disturbance d which has been estimated is not subtracted from the manipulated variables MV1 and MV2 for the heaters 25a and 25b; and this differs from the case with the second embodiment.

Figure 11:
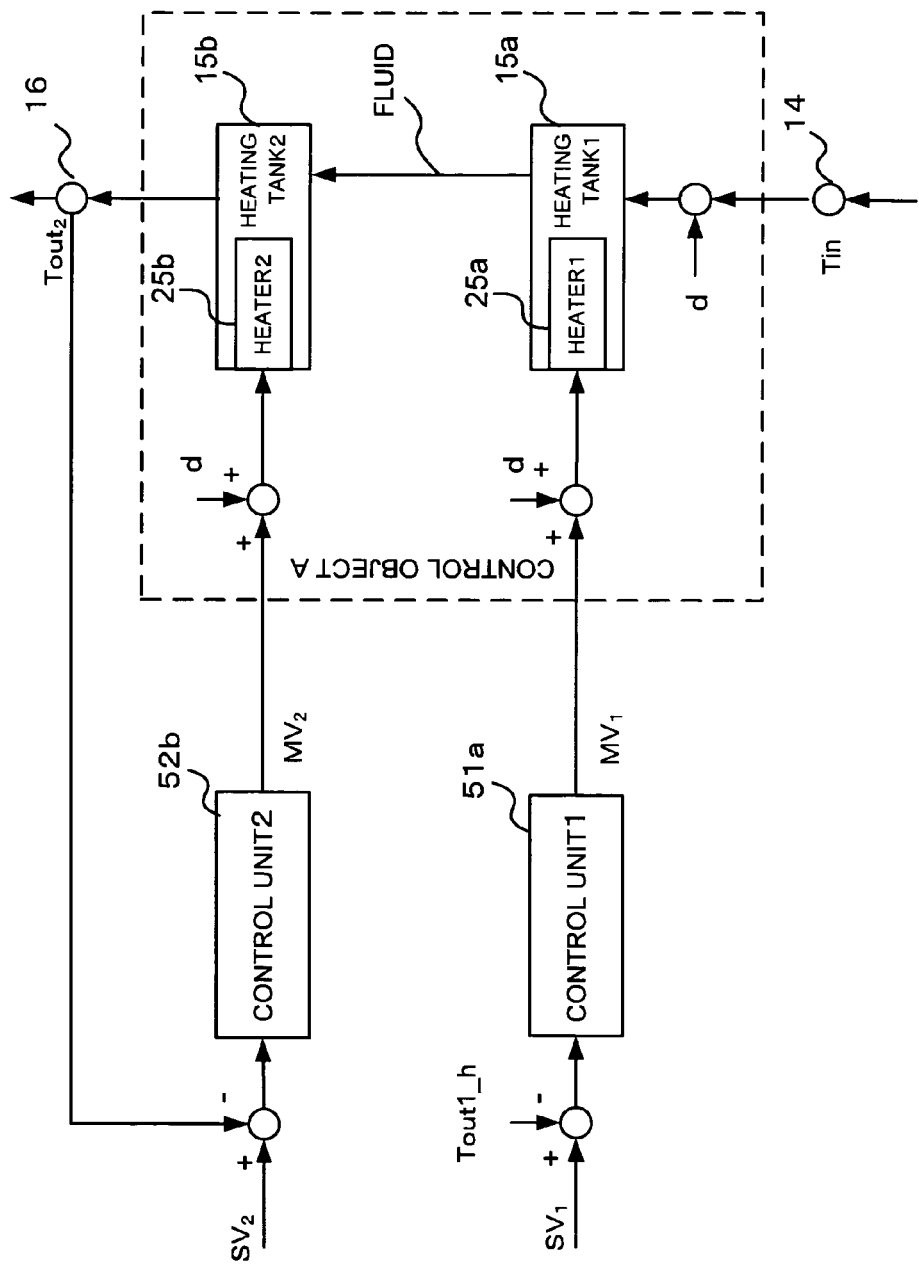
FIG. 11 is a block diagram of the temperature control device 1 according to the fourth embodiment.
Figure 12A:
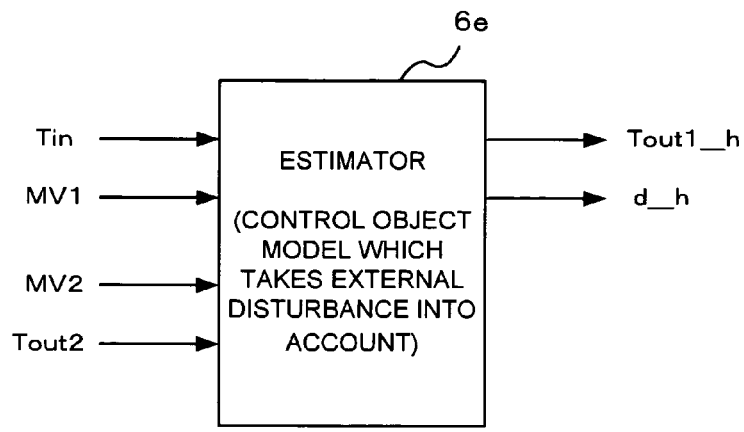
FIG. 12 is a block diagram of an estimator 6a according to the fourth embodiment.

A block diagram of a temperature control device 1 according to this fourth embodiment, and a block diagram of the estimator 6e, are shown in FIGS. 11 and 12.

Figure 12B:
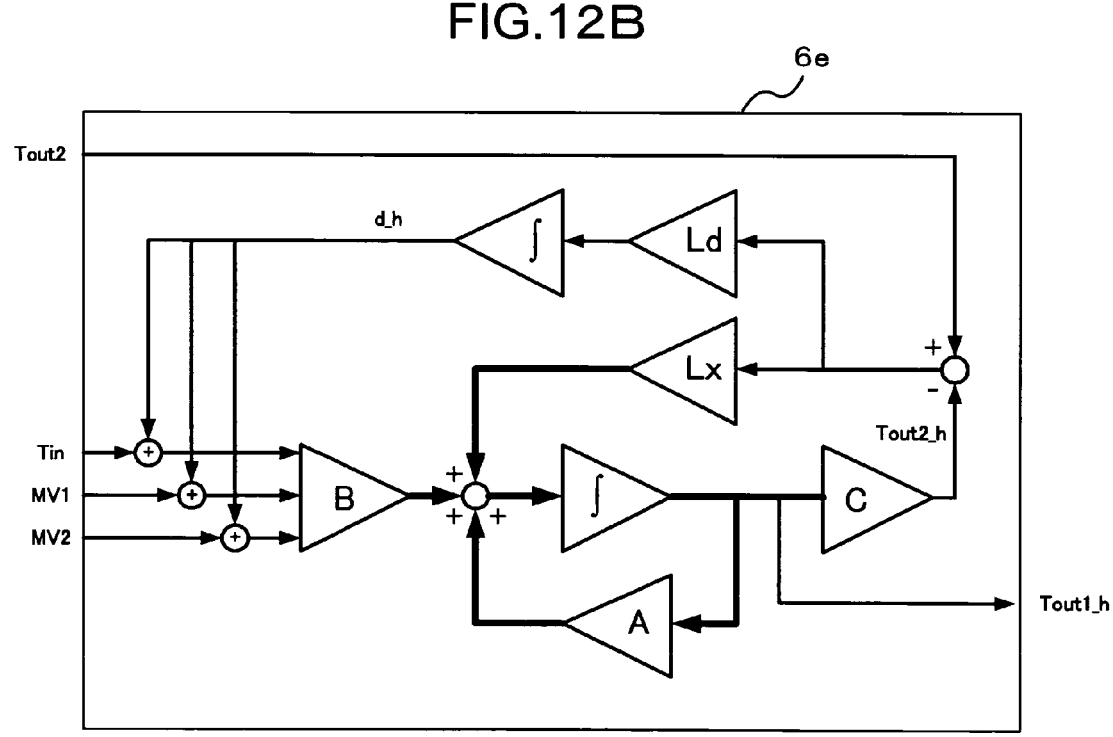

As shown in FIG. 11, for the control object A, it is hypothesized that the same virtual disturbance d is present for the input temperature Tin and the manipulated variables MV1 and MV2 from the individual control units 51a and 51b. Thus, the estimator 6e shown in FIG. 12A estimates the outlet temperatures Tout1_h and Tout2_h for the outlets of the heating tanks 15. Moreover, the estimator 6e of this embodiment is built so as to incorporate the integration element 61e described above, and obtains the integrated value of the error in the actual outlet temperature Tout2 and its estimated value Tout2_h, and estimates this as the disturbance d_h. And, as shown in FIG. 12B, the disturbance d_h which has been estimated is added, within the estimator 6e, to the input temperature Tin and the manipulated variables MV1 and MV2.

Due to this, even if as in the third embodiment the estimator is not designed so that the gains become equal, the corrected manipulated variables always become the same, and it is possible to eliminate any offset to the final target temperature which originates in error of the estimated temperature. Moreover, since the manipulated variables are adjusted according to the disturbance d_h which is an integrated value, accordingly it is possible to plan the design so as not to experience any constraints upon the response or the stability, as with the third embodiment.

Next, the explanation of the estimator 6e according to this embodiment by general formulas goes as follows.

A model of a control object with m inputs and l outputs is given by Equation (1) above. Here, if (C,A) is observable, then the estimator can be constructed, and, if the estimated value of x is termed x_h, this is given by Equation (6):

Here, if it is considered that the same disturbance d: (1×1) is added to all of the inputs, then an augmented system which includes the disturbance in the model is given by Equations (10) and (11):

$$\dot{x} = Ax + Bu + Bd \quad (10)$$

$$\begin{bmatrix} \dot{x} \\ \dot{d} \end{bmatrix} = \begin{bmatrix} A & B' \\ 0 & 0 \end{bmatrix} \begin{bmatrix} x \\ d \end{bmatrix} + \begin{bmatrix} B \\ 0 \end{bmatrix} u \quad (11)$$

$$y = [C \ 0] \begin{bmatrix} x \\ d \end{bmatrix}$$

$$B' = \begin{bmatrix} \sum_{j=1}^{m} b_{1j} \\ \sum_{j=1}^{m} b_{2j} \\ \vdots \\ \sum_{j=1}^{m} b_{nj} \end{bmatrix} B' : n \times 1$$

$b_{ij}(i = 1 \ldots n, j = 1 \ldots m)$ is an element of $B$ $$\begin{bmatrix} A & B' \\ 0 & 0 \end{bmatrix} : (n+1) \times (n+1)$$

$$\begin{bmatrix} B \\ 0 \end{bmatrix} : (n+m) \times m$$

$[C \ 0] : l \times (n+m)$

When $$\left( [C \ 0], \begin{bmatrix} A & B' \\ 0 & 0 \end{bmatrix} \right)$$

is observable, then the estimator can be constructed, and, if the estimated values of x and d are termed x_h and d_h respectively, and the gains of the estimator are Lx and Ld, then these are given by Equation (12):

$$\begin{bmatrix} \dot{\hat{x}} \\ \dot{\hat{d}} \end{bmatrix} = \begin{bmatrix} A & B' \\ 0 & 0 \end{bmatrix} \begin{bmatrix} \hat{x} \\ \hat{d} \end{bmatrix} + \begin{bmatrix} B \\ 0 \end{bmatrix} u + \begin{bmatrix} Lx \\ Ld \end{bmatrix} \left( y - [C \ 0] \begin{bmatrix} \hat{x} \\ \hat{d} \end{bmatrix} \right) \quad (12)$$

Next, FIG. 13 is a flow chart showing the sequence of processing performed by the above described temperature control device 1. This processing sequence is the same to all of the embodiments described above, unless individual circumstances for each embodiment are mentioned. The processing sequence will now be explained with reference to this figure.

First, after initialization of the control unit 5 has been performed, the control starts (in steps S11 and S12).

Next, along with acquiring the flow rate per unit time, the inlet temperature Tin, and the outlet temperature Tout2 as measured by the flow rate sensor 13, the inlet temperature sensor 14, and the outlet temperature sensor 16, the manipulated variables MV1 and MV2 determined by the control unit 5 are acquired (a step S13). These manipulated variables MV1 and MV2 are calculated in the step S16 explained below.

And, after having adjusted the parameters of the estimator 6 according to the flow rate (in a step S14), the estimator 6 inputs the inlet temperature sensor Tin, the final outlet temperature Tout2, and the manipulated variables MV1 and MV2, and performs estimation (in a step S15). As already described, the estimation values are determined in advance by each embodiment.

And the temperature deviations between the target temperatures SV1 and SV2, and the actually measured outlet temperature Tout2 or the estimated outlet temperature Tout1_h at the outlets of the heating tanks 15a and 15b are calculated, and the individual control units 51 calculate the manipulated variables MV1 and MV2 (in the steps S16 and S17). And these manipulated variables MV1 and MV2 are outputted to the heaters 25a and 25b (a step S18). Here, in the second embodiment, the disturbances d_h which have been calculated by the estimator are subtracted from Tin, MV1, and MV2.

According to the various embodiments of the present invention described above, it is possible, in a temperature control device for a fluid, to reduce the number of temperature sensors, without losing any freedom of control.

The embodiments of the present invention described above have only been shown by way of example, for explanation of the present invention; the scope of the present invention is not to be considered as being limited only to those embodiments. A person skilled in the art may implement the invention in various different ways, provided that the gist of the present invention is not deviated from.

The invention claimed is:

1. A temperature control device which performs temperature control of a fluid, comprising:
    a plurality of fluid reservoir units which are arranged in series, or in parallel, or in a combination of parallel and series, the plurality of fluid reservoir units being arranged along a conduit through which fluid flows, and the fluid reservoir units further include heaters or coolers;
    an outlet temperature sensor which is provided to an outlet of a first one of the plurality of fluid reservoir units;
    a second one of the plurality of fluid reservoir units has no outlet temperature sensor;
    an inlet temperature sensor which measures an inlet temperature of the fluid which flows into the temperature control device;
    an estimator configured to:
        modelize the fluid reservoir units having the heaters or coolers, and
        estimate an outlet temperature of the fluid at the outlet of the second one of the fluid reservoir units, to which no outlet temperature sensor is provided, based on the inlet temperature which has been measured by the inlet temperature sensor; and
    a control unit configured to:
        acquire individual target temperatures, which are target temperatures for the fluid at the outlets of each of the plurality of fluid reservoir units, including a first individual target temperature corresponding to the first one of the fluid reservoir units and a second individual target temperature corresponding to the second one of the fluid reservoir units;
        determine a first manipulated variable for the first one of the plurality of fluid reservoir units to which the outlet temperature sensor is provided, on the basis of deviations between an outlet temperature which has been measured by the outlet temperature sensor and the first individual target temperature, the first manipulated variable being a calculated value;
        determine a second manipulated variable for the second one of the plurality of fluid reservoir unit to which no outlet temperature sensor is provided, on the basis of deviations between an estimated outlet temperature which has been estimated by the estimator and the second individual target temperature, the second manipulated variable being a calculated value; and
        control the outlet temperatures of the fluid reservoir units by operating heaters or coolers on the basis of the first and second manipulated variables which have been determined.

2. The temperature control device for a fluid according to claim 1, wherein, if the plurality of fluid reservoir units are arranged in series along the fluid flow conduit, only one of the outlet temperature sensors is provided, in the neighborhood of the outlet of that fluid reservoir unit which is most downstream.

3. The temperature control device for a fluid according to claim 1, further comprising:
    a flow rate sensor which measures the flow rate per unit time of the fluid which flows through the plurality of fluid reservoir units, wherein, parameters are determined for the estimator according to the flow rate per unit time measured by the flow rate sensor.

4. The temperature control device for a fluid according to claim 1, wherein, the estimator further performs estimation of a disturbance applied to the fluid reservoir units having the heaters or coolers, wherein the disturbance represents an external effect on the heaters or coolers.

5. The temperature control device for a fluid according to claim 1, wherein,
    further performs estimation of individual disturbances applied to each of the fluid reservoir units having the heaters or coolers, wherein one of the individual disturbances represents an external effect on one of the heaters or coolers; and
    the control unit:
        corrects the first and second manipulated variables by the individual disturbances of the one of the heaters or coolers for each of the fluid reservoir units;
        controls the outlet temperatures of the fluid reservoir units by operating the heaters or coolers, on the basis of the first and second manipulated variables which have been corrected; and
        estimates temperature on the basis of the and second manipulated variables which have been corrected.

6. The temperature control device for a fluid according to claim 1, wherein, the estimator, along with having a model of the plurality of fluid reservoir units which possess the heaters or coolers and all of which have a same model, also is adapted to make correction amounts which are applied to the first and second manipulated variables of the model of the fluid reservoir units having the heaters or coolers, all to become equal, wherein the correction amounts are an amount of error correction.

7. The temperature control device for a fluid according to claim 1, wherein the estimator is further configured to
    have a model of the plurality of fluid reservoir units which possess the heaters or coolers and all of which have a same model,
    assume that a same disturbance is applied to the plurality of fluid reservoir units which have the heaters or coolers and perform estimation of the same disturbance, wherein the same disturbance represents an external effect on the heaters or coolers, and
    make the correction amounts, which are applied to the first and second manipulated variables of the model of the fluid reservoir units having the heaters or coolers, all to become equal, wherein the correction amounts are an amount of error correction.

8. The temperature control device for a fluid according to claim 1, wherein the control unit comprises plural individual control units that individually control the heaters or coolers of the fluid reservoir units.

9. The temperature control device for a fluid according to claim 1, wherein there are at least two of the fluid reservoir units.

10. A temperature control method for performing temperature control of a fluid, comprising:

acquiring, in a control unit, individual target temperatures, which are target temperatures for the fluid at outlets of each of a plurality of fluid reservoir units which are arranged in series, in parallel, or in a combination of parallel and series, the plurality of fluid reservoir units being arranged along a conduit through which the fluid flows, and the fluid reservoir units including heaters or coolers;

measuring, in an inlet temperature sensor, an inlet temperature of the fluid;

measuring, in an outlet temperature sensor, an outlet temperature of the fluid at the outlet of a first one of the plurality of fluid reservoir units, among the plurality of fluid reservoir units;

estimating the outlet temperature of the fluid at the outlet of a second one of the plurality of fluid reservoir units to which no outlet temperature sensor is provided based on the inlet temperature, using an estimator which modelizes the fluid reservoir units having the heaters or coolers;

determining, in the control unit, a first manipulated variable for the first one of the fluid reservoir units whose outlet temperature is measured, on the basis of deviations between the outlet temperature which has been measured by the outlet temperature sensor and one of the individual target temperatures corresponding to the first one of the fluid reservoir units, the first manipulated variable being a calculated value;

determining, in the control unit, a second manipulated variable for the second one of the fluid reservoir units whose outlet temperature is not measured, on the basis of deviations between an estimated outlet temperature which has been estimated by the estimator and one of the individual target temperatures corresponding to the second one of the fluid reservoir units, the second manipulated variable being a calculated value; and controlling, in the control unit, the outlet temperatures of the fluid reservoir units by operating the heaters or coolers on the basis of the first and second manipulated variables which have been determined.

* * * * *